Patented Mar. 24, 1936

2,034,850

UNITED STATES PATENT OFFICE 2,034,850

ACYL HALIDES OF TERTIARY BUTYL ACETIC ACID

Frank C. Whitmore, State College, Pa., and August H. Homeyer, St. Louis, Mo., assignors to Mallinckrodt Chemical Works, St. Louis, Mo., a corporation of Missouri No Drawing. Application April 17, 1933, Serial No. 666,512. Renewed November 11, 1935

6 Claims. (Cl. 260—123)

This invention relates to acyl halide derivatives of tertiary butyl acetic acid, and with regard to certain more specific features, to such derivatives corresponding generally to the type formula:

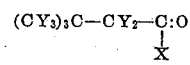

wherein Y indicates a hydrogen or halogen atom, and X indicates a halogen atom.

Among the several objects of the invention may be noted the provision of a series of acyl halides of tertiary butyl acetic acid which all embody the therapeutic effect of the "neopentyl" arrangement, that is, an arrangement wherein one carbon atom is attached to four other carbon atoms, and which correspond generally to the type-formula given above. Other objects will be in part obvious and in part pointed out hereinafter.

The invention accordingly comprises the elements and combination of elements, and features of composition, which will be exemplified in the products hereinafter described, and the scope of the application of which will be indicated in the following claims.

It has recently been determined that certain organic products including as a constituent thereof a carbon atom linked to four other carbon atoms, such as represented by the type formula:

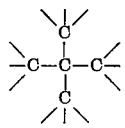

have valuable properties, particularly in the field of hypnotics, sedatives, soporifics, analgesics, and bactericides and the like. This arrangement, whereby one carbon atom is linked to four other carbon atoms, will hereinafter be referred to as the "neopentyl" arrangement.

Among the several neopentyl-containing substances, a most valuable group comprises the acyl halide derivatives of tertiary butyl acetic acid. These derivatives either directly or as intermediates for the preparation of more complex derivatives, have been determined generally to have valuable hypnotic or sedative or soporific effects when administered therapeutically, such effects being markedly improved over similar effects obtained from analogous compounds not containing the neopentyl arrangement. The enhanced effect seems to be due to the fact that in the neopentyl arrangement, the alkyl chain is branched to the maximum possible extent when the neopentyl group is present.

As a starting point for the preparation of the various derivatives covered by the present invention, tertiary butyl acetic acid itself is usually used. This acid is most preferably prepared according to the patent application of the present inventors and Walter R. Trent, Serial No. 666,511, filed April 17, 1933, now Patent No. 2,004,066, dated June 4, 1935. For clarity, the various derivatives will be grouped according to their constitution.

A.—Unsubstituted tertiary butyl acetyl halides

The substances are in general prepared by the action of strong halogenating compounds (such as thionyl halides and phosphorus tri- and penta-halides) upon tertiary butyl acetic acid. For example, using tionyl halides:

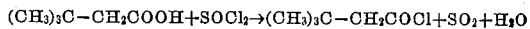

Example 1.—Tertiary butyl acetyl chloride

Prepared by the reaction above given, using thionyl chloride.

For example, 170 grams of thionyl chloride were placed in a flask fitted with a reflux condenser. A dropping funnel containing 133 grams of tertiary butyl acetic acid was fitted to the top of the condenser with a two-hole stopper, the other hole being fitted with a tube for the discharge of the gaseous products of the reaction. The thionyl chloride was warmed gently on a steam bath, and the acid slowly dropped therein. After all of the acid had been added, the mixture was heated for a further hour. Fractionation of the resulting mixture yielded 144 grams of tertiary butyl acetyl chloride, a yield of 93% of the theoretical.

The product, tertiary butyl acetyl chloride, which is a colorless liquid, has the following properties:

Boiling point, 79–81° C. at 150 mm. pressure.
Density, at 20° C. with respect to water at 20° C., 0.9696.
Density, at 20° C. with respect to water at 4° C., 0.9679.
Index of refraction, at 20° C., with respect to sodium-D line, 1.4210.

This acetyl chloride is a valuable intermediate for the preparation of the esters of tertiary butyl acetic acid, which are of therapeutic value.

B.—Substituted tertiary butyl acetyl halides

Prepared, in general, by direct halogenation of the corresponding primary acetyl halides.

Example 2.—Alpha-bromo tertiary butyl acetyl chloride

This is prepared by the action of bromine on the tertiary butyl acetyl chloride made as above, according to the reaction:

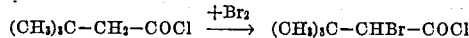

For example, 30 grams of tertiary butyl acetyl chloride are placed in a flask of the type described in connection with the making of the acetyl chloride above, and, while this is heated on the steam bath, 13 cc. of bromine are added during four hours. The bromine is used up completely, but 3 cc. additional did not react. The yield was approximately 44 grams of alpha-bromo tertiary butyl acetyl chloride.

The product, alpha-bromo tertiary butyl acetyl chloride, which is a colorless liquid, boils at 93–97° C. under 36–38 mm. pressure.

Example 3.—Alpha-bromo tertiary butyl acetyl bromide

This may be made by the general reaction given, but it is more advantageously made directly by treating tertiary butyl acetic acid with bromine according to the reaction:

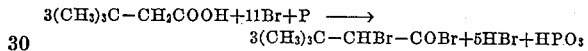

For example, 3.9 grams of red phosphorus were placed in a 200 cc. flask with 35 grams of tertiary butyl acetic acid. A reflux condenser fitted with a small separatory funnel was provided for the flask. Through the funnel, 35 cc. of bromine were added drop-wise through a period of 1½ hours, the flask being cooled in a water bath and shaken at intervals. After all of the bromine had been added, the reaction mixture was warmed on a water bath for 1½ hours. The crude product (95 grams) was decanted and purified by distillation, to yield 84 grams of product. The theoretical yield is 78 grams—the excess obtained being, most likely, free hydrogen bromide in the product.

The product, alpha-bromo tertiary butyl acetyl bromide, which is a yellow to red liquid, changing to purple, boils at 82° C. under 18 mm. pressure.

From the above, it will be seen that numerous derivatives corresponding to the type formula have been made and identified. The invention is not limited, however, to those derivatives specifically described, as many others are capable of being made in the same and different manners.

As many changes could be made in carrying out the above compositions and processes without departing from the scope of the invention, it is intended that all matter contained in the above description shall be interpreted as illustrative and not in a limiting sense.

We claim:
1. A tertiary butyl acetyl halide.
2. Tertiary butyl acetyl chloride.
3. An alpha-bromo tertiary butyl acetyl halide.
4. Alpha-bromo tertiary butyl acetyl chloride.
5. Alpha-bromo tertiary butyl acetyl bromide.
6. An alpha-halogenated tertiary butyl acetyl halide.

FRANK C. WHITMORE.
AUGUST H. HOMEYER.